Feb. 24, 1948.    C. V. MIDDLETON    2,436,758
BRAKE DRUM COOLING DEVICE
Filed Feb. 19, 1945    2 Sheets-Sheet 1

INVENTOR.
Clifford V Middleton
BY
Cook & Robinson
ATTORNEYS

Feb. 24, 1948.  C. V. MIDDLETON  2,436,758
BRAKE DRUM COOLING DEVICE
Filed Feb. 19, 1945  2 Sheets-Sheet 2
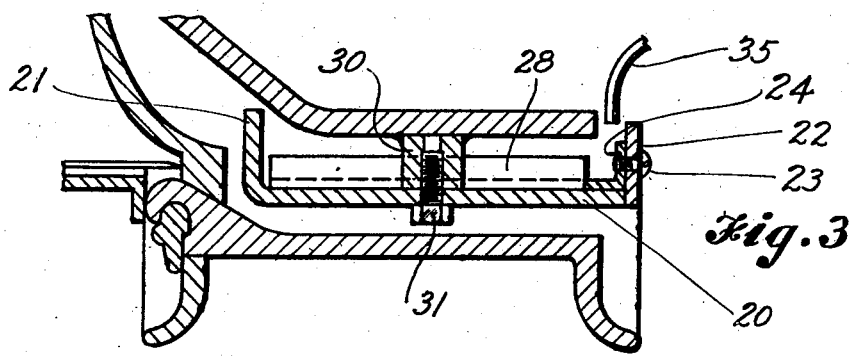
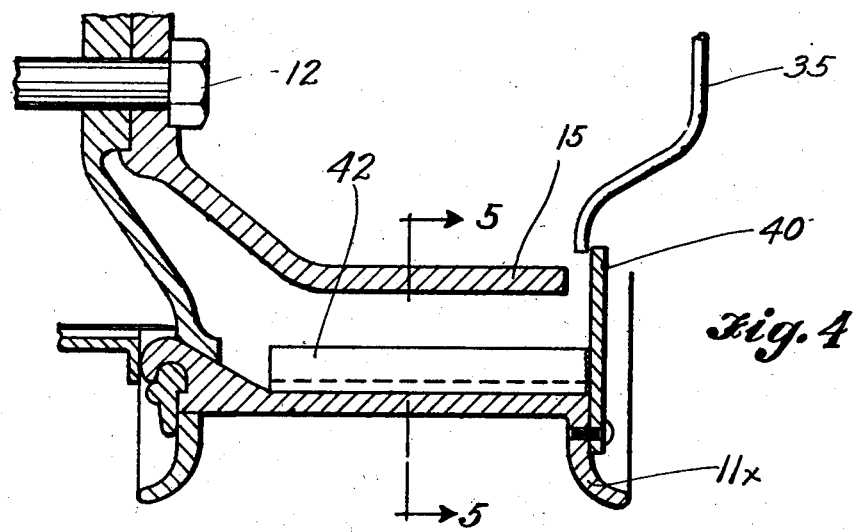
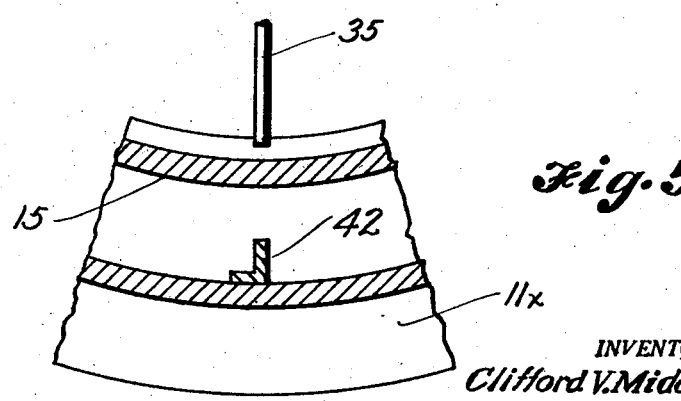
INVENTOR.
Clifford V. Middleton
BY
Cook & Robinson
ATTORNEYS Patented Feb. 24, 1948

2,436,758

UNITED STATES PATENT OFFICE 2,436,758

BRAKE DRUM COOLING DEVICE

Clifford V. Middleton, Concrete, Wash.

Application February 19, 1945, Serial No. 578,622

8 Claims. (Cl. 188—264)

This invention relates to improvements in vehicle brakes, and it has reference more particularly to means or devices whereby water, as a cooling medium, may be discharged upon and maintained most effectively in cooling contact with the brake drum of a vehicle wheel braking mechanism to prevent overheating of the braking elements.

As matter explanatory to the present invention, it will here be stated that in the hauling of heavy loads over mountainous country; for example, as carried on in present-day logging operations by means of trucks and trailers, it becomes necessary to frequently and repeatedly apply the vehicle brakes and to maintain them applied for long intervals of time. The result of this braking action is the generation of intense heat from the frictional contact of brake shoes and drum. Heating of these parts quite frequently results in breaking, warping or otherwise damaging them and materially affects braking efficiency.

Heretofore, it has been a common practise to simply discharge water from a tank or bucket onto the brake drum to overcome these results, but even while this is done, repeated dousings are required for effective cooling. Such a method of brake cooling requires the carrying of a considerable supply of water, since upon its application, it immediately runs off onto the ground and is lost. Furthermore, the usual application of water is not the most satisfactory from the standpoint of cooling effect.

In view of the foregoing, it has been the principal object of this invention to provide a more efficient and more practical means than heretofore used for cooling the braking elements with water.

More specifically stated, the objects of the present invention reside in the provision of devices in connection with the brake drum of a braking mechanism whereby cooling water may be applied to and then repeatedly poured over the drum, together with means for supplying water to said devices as required to replenish that which is dissipated by heat and by being splashed or thrown from the brake drum.

It is also an object of this invention to provide a brake cooling means comprising a casing adapted to be applied about the brake drum with clearance between them, to rotate therewith and to receive the cooling water from a source of supply, and to retain water in its lower portion in contact with the drum, and to carry the water up and to discharge it over the top portion of the drum as it rotates. After attaining a certain speed, centrifugal force submerges the whole drum in water, thus to most effectively cool the drum with a minimum use of water and a minimum loss of time.

A further object of the invention resides in the provision of water retaining casings of the character above stated that may be readily removed from about the brake drum to give access thereto for the repair or replacement of parts.

Yet another object of the invention is to provide means whereby the tire mounting rim of a vehicle wheel may be adapted for use as a water retaining casing for brake cooling purposes.

Still further objects of the invention are to be found in the details of construction of parts, in their combination and use as will hereinafter be fully described.

In accomplishing these and other objects of the invention, I have provided the improved details of construction, the preferred forms of which are illustrated in the accompanying drawings, wherein—

Fig. 3 is an enlarged, sectional detail taken on line 3—3 in Fig. 2.

Fig. 4 is a sectional detail of a wheel wherein the tire mounting rim is equipped to serve as a water retaining casing.

Fig. 5 is a section taken on line 5—5 in Fig. 4.

Referring more in detail to the drawings—

Figure 1:
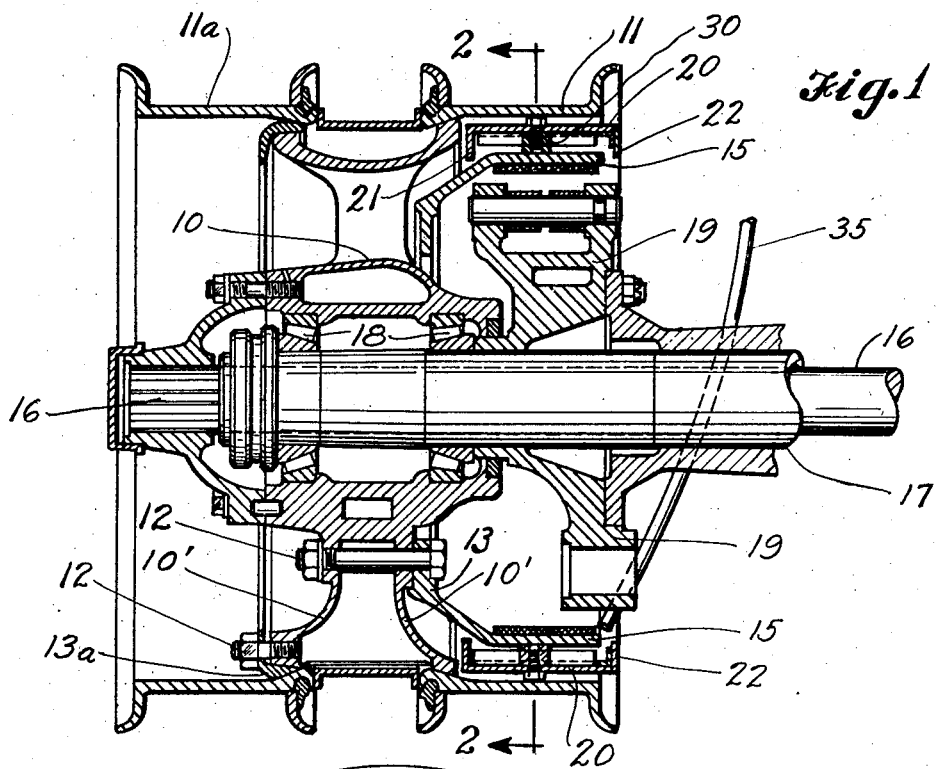
Fig. 1 is a cross section taken in the axial line of a truck wheel, showing a brake cooling means applied thereto in accordance with the objects of the present invention.

In Fig. 1 I have illustrated a typical dual wheel truck as applied to an automobile, trailer or the like. This wheel comprises a hub portion 10 to which the dual wheels 11 and 11a are affixed by bolts 12 applied through the hub flange 10' and the wheel mounting disks 13 and 13a. Also mounted on the hub flange 10' by means of the bolts 12, is the brake drum 15. The wheel hub 10 is mounted on a driving axle 16 and this is rotatably supported in an axle housing 17 by bearings 18. At the end of the axle housing is a fixed disk 19 on which the internal brake shoes, not herein shown, are mounted to functionally engage the cylindrical drum flange for braking purposes.

Figure 2:
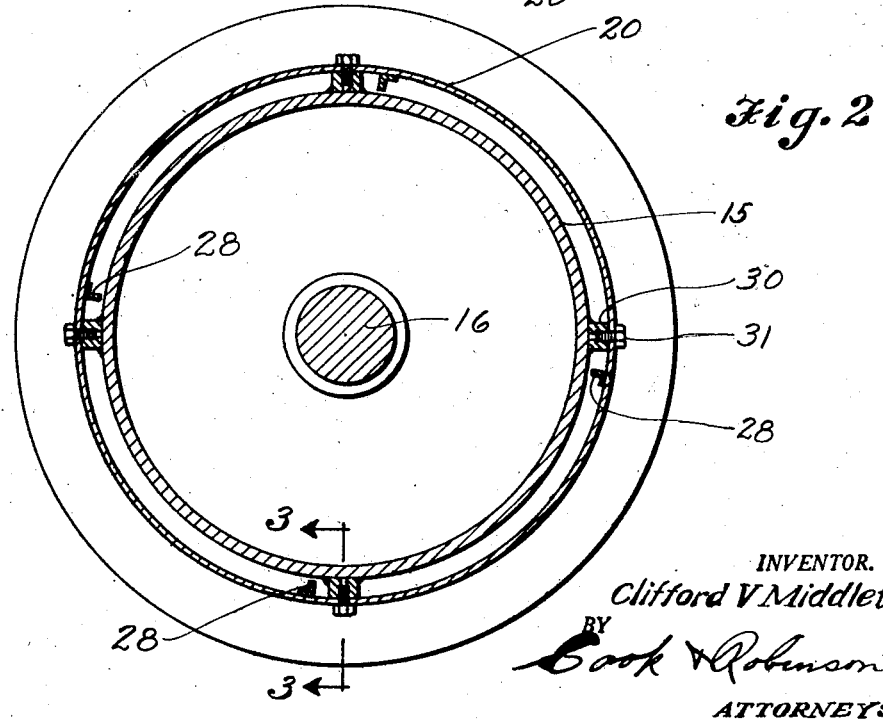
Fig. 2 is a cross-section, taken on the line 2—2 in Fig. 1, illustrating the manner of applying the water retaining casing to the brake drum.

In accordance with the objects of the present invention, I apply an annular, water retaining casing 20 concentrically about the brake drum, as shown in Figs. 1 and 2. Preferably the casing is spaced from three-eighths to one-half inch from the drum, is somewhat greater in width so as to extend at its ends somewhat beyond the ends of the cylindrical brake drum, and is secured to the drum to rotate therewith.

The cylindrical casing is equipped with an inner end wall 21 and has an outer end wall 22. These end walls extend inwardly from the body portion of the cylindrical casing to a distance that is slightly within the periphery of the drum, as noted in Fig. 3, and preferably the inner wall 21 extends slightly more than the outer wall so that when filled with water, the water will spill over the outer wall instead of over the inner wall.

In the formation of this casing, the outer wall 22 may be made as a part integral with the cylindrical body portion, but it is preferred that the inner wall element be detachable in order that it may be readily removed for brake repair.

As seen best in Fig. 3, the mode of attaching the wall member 22 is by means of screws 23 applied therethrough and threaded into an annular angle iron band 24 that is fixed to the cylindrical body portion. The part 24 is of lesser diameter than the drum so as not to interfere with brake repair or replacement.

The casing, as above provided, is in the nature of an annular trough adapted to contain a certain amount of water in its lower portion, at least to a depth that will rise into contact with the lower part of the drum. The casing 20 rotates with the wheel and drum, and in order that the water that is retained in the lower portion of the drum may be lifted and repeatedly poured over the top of the drum, the casing is equipped at spaced intervals at the inside with transverse ribs or flanges 28, as best shown in Figs. 2 and 3.

The preferred means for attaching the casing to the brake drum is shown in Figs. 2 and 3, wherein it is noted that nuts 30 are welded to the outside of the drum at regularly spaced intervals thereabout, and bolts 31 are passed through the cylindrical wall of the casing and are threaded into these nuts. As an alternative the nuts 30 may be welded to the inside of the jacket 20, screwing the bolts down tight against the drum.

In use of this drum cooling means, water is supplied as needed to the casing through its open inner end, by suitable means; for example, through a small pipe or hose 35 shown in Fig. 1. Excess water will overflow the outer end wall and fall to the ground. When the wheel is rotating, water from the lower part of the casing will be lifted by the rotating casing, and ribs fixed therein, to the top of the drum and poured thereover to maintain it in a cooled condition. The agitation and lifting of the water also tends to dissipate the heat therefrom and therefore adds to its effectiveness as a cooling medium.

In Figs. 4 and 5, I have illustrated the adaptation of a wheel tire mounting rim as a water retaining casing; this being applicable where there is not sufficient space between the drum and rim for the use of a casing as shown in Fig. 1. In this adaptation, an annular wall 40 is fixed to the outer edge flange of the wheel rim 11x to extend inwardly therefrom. This wall extends inwardly to slightly overlap the drum, thus to provide a water retaining trough in which water can be retained to a depth sufficient to contact the drum as in the previously described structure. Water is supplied to this casing in the same manner as previously described. Also, it is preferred that flanges or paddles 42 be fixed to the wall 40 to extend inwardly and close to the wheel rim, as seen in Fig. 5, to facilitate the lifting of the water as the wheel rotates, to carry it to and deliver it onto the top of the brake drum.

In the construction of the water retaining casing, either as seen in Fig. 1 or Fig. 4, the parts could, if it be desired, be made in semi-circular segments to be joined at their ends to form the circular casings. This would facilitate application in some instances and would also make their removal from a wheel easier if it was not desired to remove the wheel from the vehicle.

Furthermore, it has been anticipated that such casing be made as an integral part of a brake drum or as a part to be permanently fixed to a brake drum.

When the casings are made up of detachable parts, as in Figs. 3 and 4, it is understood that they would be fitted or equipped for assembly in water tight joints so as to avoid waste of water from the retaining trough.

Such brake cooling equipment is effective and efficient in use; it prevents drum breakage or warping; it maintains a higher coefficient of friction, and eliminates many of the difficulties encountered in the use of the inside dual tires.

Furthermore, less water is required for its operation, and much time otherwise taken in watering the brakes, is saved for useful purposes.

Having thus described my invention, what I claim as new therein and desire to secure by Letters Patent is:

1. A cooling water-retaining casing for a vehicle brake drum, comprising an annular trough-like member of greater diameter and width than the brake drum and including a peripheral wall and inwardly projecting side walls carried by the peripheral wall, and means to secure the casing in surrounding relation to and upon the brake drum.

2. A cooling water-retaining casing for a vehicle brake drum, comprising an annular trough-like member of greater diameter and width than the brake drum and including a peripheral wall and inwardly projecting side walls carried by the peripheral wall, and means to secure the casing in surrounding relation to and upon the brake drum; said side walls being of a width to extend inwardly beyond the peripheral wall of the brake drum, and transverse vanes on the inside of the peripheral wall of the casing for carrying the water around and discharging it upon the upper portion of the drum as the latter and the casing rotate.

3. In combination with a vehicle brake drum, a casing of greater diameter and width than the brake drum, said casing surrounding the brake drum in spaced concentric relation thereto and including a peripheral wall and side walls projecting inwardly beyond the peripheral wall of the brake drum, and means securing the casing on the brake drum.

4. A vehicle wheel having a body disk, a tire mounting rim fixed thereon and a brake drum fixed to the wheel concentrically within the said rim, with clearance between them, and an annular wall member fixed to the said tire rim and extending inwardly therefrom whereby, with the said rim and disk, to form a trough for flow of water therein in cooling contact with the brake drum as the wheel rotates.

5. A vehicle wheel having a body disk, a tire mounting rim fixed thereon and a brake drum fixed to the wheel concentrically within the said rim, with clearance between them, and an annular wall member fixed to the said tire rim and extending inwardly therefrom whereby, with the said rim and disk, to form a trough for flow of water therein in cooling contact with the brake drum as the wheel rotates, and paddles fixed to the said wall and extended into the trough for lifting the water in the trough to the top of the drum, there to discharge it over the drum as the wheel rotates.

6. A wheel as recited in claim 5 wherein means is provided for supplying water to the trough as the wheel rotates.

7. In a vehicle of the character described having a brake drum; an annular, inwardly facing, open trough concentrically encircling the drum, with clearance between said trough and drum, and adapted to rotate therewith, and having side walls for retaining water to sufficient depth in the trough before overflow therefrom for contact with the drum, and means for supplying water to the trough as the wheel rotates.

8. In a vehicle of the character described having a brake drum; an annular, open and inwardly facing trough-like casing concentrically encircling the drum, with clearance between said casing and drum, and adapted to rotate with the drum; said trough having side walls of a height to retain water in the trough to sufficient depth before overflow to contact with the drum, and paddles fixed in the trough whereby the trough water will be lifted with the trough as it rotates for pouring thereby over the top portion of the drum, and means for supplying water to the trough as it rotates.

CLIFFORD V. MIDDLETON.

REFERENCES CITED

The following references are of record in the file of this patent:

UNITED STATES PATENTS

| Number | Name | Date |
|---|---|---|
| 1,613,680 | Timbs | Jan. 11, 1927 |
| 1,434,770 | Bryson | Nov. 7, 1922 |
| 1,245,040 | Scaife | Oct. 30, 1917 |
| 2,060,826 | Roberts | Nov. 17, 1936 |
| 1,628,492 | Dobrowolski et al. | May 10, 1927 |

FOREIGN PATENTS

| Number | Country | Date |
|---|---|---|
| 338,237 | Germany | July 18, 1921 |